United States Patent                                                                                       [11] 3,620,970

[72] Inventors  Eugene D. Klug
                Wilmington;
                Harold M. Spurlin, Cooper Farms,
                Wilmington; William L. Young, III,
                Heritage Park, Wilmington, all of Del.
[21] Appl. No.  855,727
[22] Filed      Sept. 5, 1969
[45] Patented   Nov. 16, 1971
[73] Assignee   Hercules Incorporated
                Wilmington, Del.

[54] REVERSE OSMOSIS MEMBRANES FROM
     HYDROXYALKYL DERIVATIVES OF CELLULOSE
     18 Claims, No Drawings
[52] U.S. Cl. .................................................... 210/23,
                                              210/321, 210/500

[51] Int. Cl. .................................................... B01d 13/00
[50] Field of Search ...................................... 210/22, 23,
                                                              321, 500

[56]              References Cited
              UNITED STATES PATENTS
3,228,877   1/1966   Mahon .......................... 210/500 X
3,276,996  10/1966   Lazare ..........................    210/22
3,278,521  10/1966   Klug .............................   260/231

Primary Examiner—Frank A. Spear, Jr.
Attorney—Eleanor R. Bartholomew

ABSTRACT: The invention provides reverse osmosis membranes characterized by a salt-rejecting layer of a hydroxyalkyl derivative of cellulose. The membranes are useful for desalination and other processes involving reverse osmosis.

REVERSE OSMOSIS MEMBRANES FROM HYDROXYALKYL DERIVATIVES OF CELLULOSE

The present invention relates to reverse osmosis membranes. More particularly, it relates to semipermeable membranes useful for desalting brackish and sea water through reverse osmosis, as well as for other applications involving reverse osmosis.

One of the present commercial methods for the desalination of water involves forcing the saline water under pressure through a semipermeable membrane which discriminates between salt ions and water molecules, allowing water molecules to pass nearly uninhibited through the membrane while rejecting the larger salt ions. At the present time the only semipermeable membranes used commercially in the desalination of water are composed of either cellulose acetate or a derivative of nylon. The cellulose acetate membranes are either symmetric membranes made from dense cellulose acetate or asymmetric ultrathin membranes known as Loeb-type membranes. See. U.S. Pat. Nos. 3,133,132 and 3,133,137. Membranes made from nylon derivatives are a more recent development and are marketed under the trademark "Permasep" in the form of isotropic hollow fibers.

There are two factors that are important in judging the performance of a semipermeable membrane for the desalination of water. First, it must reject at least 95 percent of salt ions and, secondly, it must have an acceptable flux rate which is a measure of the number of gallons of water per square foot per day (g.f.d.) which can be forced through the membrane. Unfortunately, in the case of any given polymer these two properties are normally inversely proportional to each other, i.e., the higher the salt-rejecting capacity, the lower the flux rate, and vice versa.

From the standpoint of initial performance, the Loeb-type cellulose acetate membranes are quite acceptable. In commercial use they are capable of rejecting more than 95 percent of sodium and chlorine ions at a flux rate between 10–20 g.f.d. However, they possess poor resistance to compaction and are susceptible to hydrolytic and biological degradation. Hence, under many operating conditions they have short membrane lifetimes. On the other hand, Permasep membranes have excellent resistance to compaction and biological degradation but have extremely low flux rates in the order of 0.01–0.1 g.f.d.

The present invention relates to novel reverse osmosis membranes useful for desalination of water and other purposes. The membranes of the invention are characterized by a salt-rejecting layer comprising a thin film of a hydroxyalkyl derivative of cellulose, as hereinafter defined. The experimental techniques by which the membranes of the present invention have been prepared have not been sufficiently refined to produce a membrane having a salt-rejecting layer as thin as the ultra-thin salt-rejecting layer of the asymmetric Loeb-type cellulose acetate membranes, and for this reason it is not possible to compare directly the flux rates of the present membranes with those of the asymmetric Loeb-type membranes. However, allowing for the greater thickness of the salt-rejecting layer in the membranes of the invention, as prepared to date, the flux rate of the more permeable of the membranes of the invention is surprisingly high and when calculated on an equivalent thickness basis is equal to or better than the asymmetric Loeb-type membranes. Furthermore, great versatility is achievable in the membranes of the invention in that by variation in chemical and physical structures it is possible to vary salt-rejecting capacity and flux rate over a wide range. Thus, for example, membranes having a very high flux rate and modest salt-rejecting capacity can be prepared which are useful primarily for purposes other than desalination of water, while membranes of good flux rate and high salt-rejecting capacity can be prepared which are eminently useful for desalination of water. In addition the membranes of the invention possess the advantage of being highly resistant to compaction and to hydrolytic and biological degradation and, hence, have long lifetimes under most all operating conditions.

The hydroxyalkyl derivative of cellulose from which the reverse osmosis membranes of two prepared is six one of the following classes:

A. hydroxyalkyl ethers of cellulose in which the hydroxyalkyl group contains from 2 to 6 carbon atoms;

B. mixed hydroxyalkyl ethers of cellulose in which the hydroxyalkyl groups contain an average of from two to six carbon atoms;

C. mixed hydroxyalkyl-alkyl and mixed hydroxyalkyl-aralkyl ethers of cellulose in which the hydroxyalkyl group contains from two to six carbon atoms and, respectively, the alkyl group contains from one to six carbon atoms and the aralkyl group contains from seven to 12 carbon atoms; and D. mixed hydroxyalkyl-aminoalkyl ethers of cellulose in which the hydroxyalkyl group contains from two to six carbon atoms and the aminoalkyl group contains from two to 10 carbon atoms;

said derivative having a number average degree of polymerization (D.P.) within the range of from 25–5,000 and an M.S. (average number of moles of alkylene oxide combined with the cellulose per anhydroglucose unit) of at least 1 and a D.S. (degree of substitution) including alkyl, aralkyl and aminoalkyl groups of at least 2 (a more detailed explanation of M.S. and D.S. can be found in U.S. Pat. No. 3,278,521 to Eugene D. Klug). Such cellulose derivatives are prepared by reacting cellulose with an alkylene oxide (class A), with mixed alkylene oxides (class B), with a mixture of alkylene oxide and alkyl chloride or aralkyl chloride (class C), or with a mixture of alkylene oxide and alkyleneamine (class D) by procedures known to the art as, for example, U.S. Pat. Nos. 3,278,521 and 3,431,254. In the practice of the invention it is possible to use a single hydroxyalkyl cellulose derivative from one of the foregoing classes or a mixture of such derivatives.

The hydroxyalkyl derivatives of cellulose within the foregoing description are without modification either soluble in water or, to a greater or lesser degree, swollen by water. Although those derivatives which are only slightly swollen in water can be used without further modification as components of reverse osmosis membranes in which the hydroxyalkyl cellulose derivative constituting the salt-rejecting layer is cross-linked to render it substantially insoluble in water. Cross-linking of hydroxyalkyl derivatives of cellulose is well known in the art and is effected by reaction with a reagent having two groups reactive with the hydroxalkyl substituents of the cellulosic derivative. Suitable cross-linking agents for use in the invention are compounds containing two or more alkylol, isocyanate or epoxide groupings, specific examples of which are dimethylolurea, ethylenedimethylolorea, hexamethylene diisocyanate, 2,4-toluene diisocyanate, methylene-bis-4-phenyl isocyanate, polymethylene-polyphenyl isocyanate, polyhydroxymethyl melamine, diglycidyl ether of bisphenol A and the triglycidyl ether of glycerol. In general, any compound having two or more reactive groups that has been found suitable for the modification of the wet strength and wash properties of cellulose fabrics and for the chemical attachment of dyestuffs to cellulose fabrics is useful as a cross-linking agent as will be apparent to those skilled in the art of cellulose chemistry. Some of these cross-linking agents require a catalyst to promote cross-linking. Cross-linking with the dimethylol compounds is conveniently catalyzed with an acid such as p-toluenesulfonic acid, while cross-linking with the diisocyanates is conveniently catalyzed with dibutyltin diacetate.

The following examples are presented for purposes of illustrating the invention and not by way of limitation. Parts and percentages are by weight.

EXAMPLES 1 THROUGH 22

These examples illustrate the preparation of flat membranes comprising films of cross-linked hydroxyalkyl cellulose derivative on a microporous substrate. Two different procedures were employed. In the first procedure a thin layer (0.1–1.0 mil) of hydroxyalkyl cellulose derivative was deposited on a 3×5 inch porous substrate which was a Millipore VF/VS filter sheet composed of mixed cellulose esters having a pore size of 0.01 micron. The substrate was first moistened with a pore-filling solvent by floating the sheet dull side down on the surface of the solvent, generally deionized water. This not only filled the pores in the substrate to reduce penetration of the polymer solution during casting but also served to preswell the substrate. Next, the moistened sheet was taped at its edges dull side down on a glass plate for rigid support during casting. This was the procedure employed in examples 1 and 3–22. In the second procedure the solution of cellulose derivative was cast separately on a smooth nonporous surface such as glass, and after drying was removed and transferred onto the porous substrate. This procedure was employed in example 2.

The casting solutions of hydroxyalkyl cellulose derivative used in the examples were prepared in water except in example 2 where dimethyl sulfoxide was employed as the solvent. After stirring for 2–24 hours to achieve thorough solution, the cross-linking reagent and catalyst were added and the resulting solution pressure filtered through a 14-micron nylon filter. Next, entrained air bubbles were allowed to dissipate by standing for a few hours and immediately thereafter a film was cast using a known technique such as casting with a knife edge or Meyer rod or dip coating or drain coating. The castings were subsequently dried 6–20 hours at room temperature in a dust-free filtered airstream and then cured to effect cross-linking at 90°–100° C. for 4–24 hours. Care was exercised during all preparative steps to reduce inclusion of extraneous contaminants such as dust and the like. Desalination tests were performed on 47 mm. discs cut from the prepared membrane using feed water containing 7,000 p.p.m. dissolved sodium chloride and 3,000 p.p.m. dissolved sodium sulfate.

TEST APPARATUS AND METHOD

Each test cell consisted of a 6-bolt Millipore 47-mm. high-pressure filter holder (Cat. No. XX45 047 00) which holds a 47 mm. diameter membrane and supporting materials on a support screen clamped between two stainless steel plates. An additional hole was drilled into the top plate, so that the brine solution could enter the cell, circulate across the surface of the membrane, and exit the cell. The permeate was collected from the bottom port of the cell and analyzed.

Eight such cells were connected in parallel, through a series of suitable valves, to three back pressure regulators, a pump and a 100-gallon reservoir, to provide a recirculating assembly capable of evaluating eight membranes simultaneously at two different pressures (four cells at each pressure). Pumping rates were up to 0.5 gallon per minute (30 gallons per hour).

The brine solution in the reservoir consisted of approximately 7,000 p.p.m. NaCl (2,730 p.p.m. $Na^+$, 4,200 p.p.m. $Cl^-$) and 3,000 p.p.m. $Na_2SO_4$ (930 p.p.m. $Na^+$, 2,000 p.p.m. $SO_4^{=}$). It was analyzed periodically for $Na^+$ and $Cl^-$ concentration, using a Beckman Expandomatic pH meter and appropriate specific ion electrodes. Sulfate ion concentrations were determined by a titration method ($BaClO_4$ method) or independently calculated by the expression p.p.m. $SO_4^{=}$=(2.09 p.p.m. $Na^+$ minus 1.35 p.p.m. $Cl^-$) These values usually agreed well with the experimentally determined values.

The brine solution also contained a small amount of both ethyl violet and Rhodamine B which was used to detect imperfections and pin holes as is commonly practiced by the art.

The membrane to be tested was cut to a 47 mm. diameter size and placed in the test cell atop two 47-mm. Millipore GS filter discs (0.22$\mu$ pore size; 45,000 g.f.d. at 1,500 p.s.i.) for support. Depending upon the number of cells in operation, the brine solution was circulated through the cell and over the membrane at the rate of 200–400 ml./min. The membranes were subjected to hydrostatic pressures of 500 p.s.i., and then 1,000 p.s.i. for long enough times to collect enough permeate for analysis. The membranes were then kept at 1,500 p.s.i. for extended lengths of time, while permeate samples were measured and analyzed periodically.

Percent rejection of any ion was calculated from the p.p.m. of the ion in the permeate and the feed solution as follows.

If $X$ is any ion (e.g., $Na^+$, $Cl^-$ or $SO_4^{=}$), then $$\text{Percent rejection of } X = \frac{(\text{p.p.m. } X \text{ in feed minus p.p.m. } X \text{ in permeate})}{\text{p.p.m. } X \text{ in feed}} \times 100$$

Details of each example and the test results therefrom are given in table I which follows. In all examples cited, the cast membrane thickness was approximately 1 mil (measured dry).

TABLE I

| | | | Saline water test results | | | | |
|---|---|---|---|---|---|---|---|
| | | Cross-linking agent/ catalyst percent of each based on cellulose derivative | | Flux, | Salt rejection, percent | | |
| Example | Cellulose derivative used ª | | Pressure | g.f.d. | $Na^+$ | $Cl^-$ | $SO_4^=$ ᵇ |
| 1 | Hydroxypropyl cellulose, Type G, 2% aqueous solution | DMU/PTSA (20/1) | 500 | 0.25 | 94.6 | 91.2 | |
| | | | 1,000 | 0.40 | 97.1 | 95.4 | |
| | | | 1,500 | 0.60 | 98.2 | 96.2 | 99.9 (99.9) |
| 2 | Hydroxypropyl cellulose, Type G, 2% DMSO solution | HMDL/DBTD (20/1) | 500 | 2.8 | 41 | 20 | |
| | | | 1,000 | 3.3 | 62 | 48 | |
| | | | 1,500 | 3.2 | 83 | 76 | (99.9) |
| 3 | Hydroxypropyl cellulose, Type G, 6% aqueous solution | DMU/PTSA (6.7/0.33) | 500 | 0.9 | 77 | 65 | |
| | | | 1,000 | 1.3 | 80 | 68 | |
| | | | 1,500 | 1.4 | 88 | 77 | (99.9) |
| 4 | do | DMU/PTSA (13.3/0.67) | 500 | | | | |
| | | | 1,000 | 0.26 | 92.3 | 83 | |
| | | | 1,500 | 0.34 | 96.9 | 91.0 | 99.7 (99.9) |
| 5 | Hydroxypropyl cellulose, Type MP, 2% aqueous solution | DMU/PTSA (20/1) | 500 | 0.58 | 96.2 | 90.6 | |
| | | | 1,000 | 1.2 | 97.2 | 95.2 | |
| | | | 1,500 | 1.6 | 99.1 | 98.1 | (99.9) |
| 6 | Hydroxypropyl cellulose, Type HA, 2% aqueous solution | DMU/PTSA (20/1) | 500 | 0.40 | 89 | 82 | |
| | | | 1,000 | 0.65 | 92 | 87 | |
| | | | 1,500 | 0.91 | 95.9 | 92.6 | (99.9) |
| 7 | Hydroxypropyl cellulose, Type G (narrow mol. wt. distribution), 2% aqueous solution. | DMU/PTSA (20/1) | 500 | 1.2 | 87 | 82 | |
| | | | 1,000 | 2.3 | 92.6 | 89 | |
| | | | 1,500 | 2.7 | 98.3 | 96.1 | 99.7 (99.9) |
| 8 | 3.0% butene-1 oxide-modified hydroxypropyl cellulose, 2% aqueous solution. | DMU/PTSA (20/1) | 500 | 0.20 | 92.6 | 86.3 | |
| | | | 1,000 | 0.46 | 94.5 | 89.4 | |
| | | | 1,500 | 0.68 | 97.4 | 94.9 | 92.6 (99.9) |
| 9 | 6.0% butene-1 oxide-modified hydroxypropyl cellulose, 2% aqueous solution. | DMU/PTSA (20/1) | 500 | 0.15 | 92.5 | 91.3 | |
| | | | 1,000 | 0.51 | 98.5 | 98.4 | |
| | | | 1,500 | 0.75 | 99.5 | 99.0 | 99.9 (99.9) |
| 10 | 12.0% butene-1 oxide-modified hydroxypropyl cellulose, 2% aqueous solution. | DMU/PTSA (20/1) | 500 | | | | |
| | | | 1,000 | 0.31 | 98.3 | 97.0 | |
| | | | 1,500 | 0.44 | 99.2 | 99.0 | (99.8) |
| 11 | 24% butene-1 oxide-modified hydroxypropyl cellulose, 2% aqueous solution. | DMU/PTSA (20/1) | 500 | | | | |
| | | | 1,000 | 0.22 | 94.0 | 92.8 | |
| | | | 1,500 | 0.22 | 99.0 | 98.4 | (99.9) |
| 12 | 36% butene-1 oxide-modified hydroxypropyl cellulose, 2% aqueous solution. | DMU/PTSA (20/1) | 500 | 0.3 | 90 | 85 | |
| | | | 1,000 | 0.6 | 91 | 88 | |
| | | | 1,500 | 0.66 | 96.4 | 93.5 | (99.9) |

TABLE I—Continued

| Example | Cellulose derivative used [a] | Cross-linking agent/ catalyst percent of each based on cellulose derivative | Saline water test results | | | | |
|---|---|---|---|---|---|---|---|
| | | | Pressure | Flux, g.f.d. | Salt rejection, percent | | |
| | | | | | Na+ | Cl− | SO₄= [b] |
| 13 | 36% butene-1 oxide-modified hydroxypropyl cellulose, 2% aqueous solution. | DMU/PTSA (40/2) | 500 | 0.2 | 93.1 | 92.6 | |
| | | | 1,000 | 0.4 | 86 | 83 | |
| | | | 1,500 | 0.6 | 99.1 | 98.8 | (99.9) |
| 14 | 5.3% ethylene oxide-modified hydroxypropyl cellulose, 2% aqueous solution. | DMU/PTSA (20/1) | 500 | | | | |
| | | | 1,000 | 0.3 | 70 | 62 | |
| | | | 1,500 | 0.8 | 93.0 | 90 | (99.9) |
| 15 | 12.9% ethylene oxide-modified hydroxypropyl cellulose, 2% aqueous solution. | DMU/PTSA (20/1) | 500 | | | | |
| | | | 1,000 | 0.2 | 91.6 | 89 | |
| | | | 1,500 | 0.6 | 98.7 | 97.9 | 99.9 (99.9) |
| 16 | 5.3% ethylene oxide-modified hydroxypropyl cellulose, 2% aqueous solution. | DMU/PTSA (40/2) | 500 | 0.2 | 94.3 | 90.6 | |
| | | | 1,000 | 0.4 | 93.3 | 89 | |
| | | | 1,500 | 0.5 | 96.7 | 94.6 | (99.9) |
| 17 | 4.8% ethyleneimine-modified hydroxypropyl cellulose, 2% aqueous solution. | DMU/PTSA (20/1) | 500 | 2.6 | 67 | 26 | |
| | | | 1,000 | 7.7 | 70 | 50 | |
| | | | 1,500 | 9.5 | 70 | 52 | 91.0 (99.9) |
| 18 | 12.2% ethyleneimine-modified hydroxypropyl cellulose, 2% aqueous solution. | DMU/PTSA (20/1) | 500 | 1.2 | 81 | 73 | |
| | | | 1,000 | 2.3 | 90 | 85 | |
| | | | 1,500 | 3.5 | 92.5 | 89 | (99.9) |
| 19 | 4.8% ethyleneimine-modified hydroxylpropyl cellulose, 2% aqueous solution. | DMU/PTSA (40/2) | 500 | 0.7 | 77 | 72 | |
| | | | 1,000 | 2.1 | 94.7 | 92.5 | |
| | | | 1,500 | 1.4 | 96.5 | 94.7 | 99.9 (99.5) |
| 20 | Ethylhydroxypropyl cellulose, 0.2 ethoxyl MS, 4% aqueous solution. | DMU/PTSA (20/1) | 500 | 5.0 | 56 | 36 | |
| | | | 1,000 | 7.4 | 51 | 37 | |
| | | | 1,500 | 6.7 | 66 | 56 | 99.9 |
| 21 | Ethylhydroxypropyl cellulose, 0.4 ethoxy MS, 4% aqueous solution. | DMU/PTSA (10.0.5) | 500 | 1.7 | 61 | 39 | |
| | | | 1,000 | 2.5 | 70 | 56 | |
| | | | 1,500 | 3.1 | 77 | 67 | 89.0 |
| 22 | Hydroxyethyl cellulose, Type H 1% aqueous solution | DMU/PTSA (40/4) | 500 | 0.5 | 77 | 68 | |
| | | | 1,000 | 0.7 | 80 | 78 | |
| | | | 1,500 | 1.3 | 87 | 85 | 96.7 (98.9) |

[a] Substituent percentages based on weight of reactant added to weight of propylene oxide (68.7 g.) used to react with 20.0 g. of cellulose.
[b] SO₄=values in brackets are calculated.

NOTE.—DMSO=dimethylsulfoxide; DMU=dimethanolurea; PTSA=p-toluenesulfonic acid; HMDI=hexamethylene diisocyanate; DBTD=dibutyl tin diacetate.

Hydroxypropyl cellulose, Type G=750–900 D.P., M.S.=∼4.
Hydroxypropyl cellulose, Type MP=2000–2300 D.P., M.S.=∼4.
Hydroxypropyl cellulose, Type HA=2500–3000 D.P., M.S.=∼4.
Hydroxyethyl cellulose, Type H=2500–3000 D.P., M.S.=∼2.5.

EXAMPLE 23

This example illustrates a trilayer membrane which is composed of two layers of film of hydroxyalkyl cellulose derivative which are cast successively upon a porous substrate by the procedure previously described. The substrate in this case was a Millipore VF sheet. The first, or intermediate, layer cast upon the substrate was a 0.75 mil film of hydroxypropyl cellulose, type G, which was crosslined with 1.7 percent of dimethylolurea as a cross-linking agent employing 0.17 percent of p-toluenesulfonic acid as the cross-linking catalyst, this layer having only modest salt-rejecting capacity because of the low level of cross-linking agent. The second, or top, layer cast was a 0.05 mil film of hydroxypropyl cellulose modified with 12 percent butene-1 oxide (0.5 percent casting solution) and cross-linked with the dimethylolurea/p-toluenesulfonic acid system (20.0 percent/2.0 percent based on weight of cellulose). As is apparent from previous examples, the top layer would be expected to have greater salt-rejecting capacity than the intermediate layer. The results of desalination tests employing the trilayer membrane of this example in comparison with a control membrane are given in table II.

EXAMPLES 24–26

These examples illustrate membranes in which the film of hydroxyalkyl cellulose derivative is cross-linked by diffusion of cross-linking reagents into the film from one surface only, thereby creating a film having a gradient in the degree of cross-linking throughout its thickness. In the preparation of the membranes a film of hydroxyalkyl cellulose derivative, either without cross-linking agent or with a low level of cross-linking agent to facilitate handling, was cast and dried on a Millipore VF substrate in the manner previously described. The thickness of the film in example 24 was 0.75 mil; in example 25, 0.25 mil; and in example 26, 1.0 mil. The surface of the film was then coated with an aqueous solution of cross-linking reagents and the coated membrane was allowed to stand for about 0.5 hour to permit diffusion of the cross-linking agent into the film. The entire membrane was then cured at 100° C. for several hours. The cross-linking agent employed in all cases was dimethanolurea and the cross-linking catalyst p-toluenesulfonic acid. Other details of each preparation and the desalination test results of these membranes employing diffusion controlled cross-linking versus control membranes lacking the diffusional process are summarized in table III.

TABLE II

| Example | Membrane description | | Saline water test results | | | | |
|---|---|---|---|---|---|---|---|
| | Intermediate layer | Top layer | Pressure, p.s.i. | Flux g.f.d. | Percent salt rejection | | |
| | | | | | Na+ | Cl− | SO₄= |
| 23 | Hydroxypropyl cellulose, Type G, ∼0.75 mil. | 12% butene oxide modified hydroxypropyl cellulose, ∼0.05 mil. | 500 | 0.8 | 90.4 | 87 | |
| | | | 1,000 | 1.3 | 93.8 | 91 | |
| | | | 1,500 | 1.5 | 97.6 | 96.5 | 99.9 |
| Control | do | None | 500 | 1.5 | 51 | 40 | |
| | | | 1,000 | 2.9 | 65 | 54 | |
| | | | 1,500 | 3.6 | 81 | 74 | 99.6 |

TABLE III

| Example | Hydroxyalkyl cellulose [a] | Base level, percent cross-linker/ catalyst [a] | Diffusing level, percent cross-linker catalyst [b] | Pressure, p.s.i. | Flux g.f.d. | Na+ | Cl− | SO4− |
|---|---|---|---|---|---|---|---|---|
| 24 | Hydroxypropyl cellulose, Type G, 3% solution | 0.01/0.001 | 0.5/0.05 | 1,000 | 1.0 | 91.2 | 87 | |
| | | | | 1,500 | 1.4 | 96.3 | 93.8 | 99.9 |
| Control | do | 0.01/0.001 | None | 1,000 | 6.2 | 48 | 35 | |
| | | | | 1,500 | 6.2 | 67 | 52 | 97.1 |
| 25 | Hydroxypropyl cellulose, Type HA, 1% solution. | 0.01/0.001 | 0.5/0.05 | 500 | 2.0 | 71 | 59 | |
| | | | | 1,000 | 2.8 | 82 | 73 | |
| | | | | 1,500 | 3.0 | 94.6 | 90.3 | 99.9 |
| Control | do | 0.01/0.001 | None | 500 | 3.1 | 58 | 39 | |
| | | | | 1,000 | 4.1 | 74 | 61 | |
| | | | | 1,500 | 4.2 | 88 | 82 | 99.9 |
| 26 | 12% butene oxide-modified hydropropyl cellulose, 2% solution. | None | 1.0/0.1 | 500 | 1.5 | 74 | 63 | |
| | | | | 1,000 | 2.3 | 87 | 79 | |
| | | | | 1,500 | 2.0 | 97.6 | 96.1 | 99.9 |

[a] As contained in casting solution (Example 24, 0.33% DMU/0.033% PTSA as based on cellulose; Example 25, 1.0% DMU/0.1% PTSA as based on cellulose).
[b] Used in coating film surface of membrane, percentage by weight in aqueous solution.

EXAMPLE 27

One hundred parts of hydroxypropyl cellulose (Type G) are vacuum dried to a moisture content of less 2%1 percent and fed to an extruder operating at 200° F. inlet temperature, 300° F. die temperature. The melt is extruded (2:1 compression ratio through a one-hole (50-mil diameter, 120-mil land) die equipped with a pin for admitting nitrogen into the center of the fiber during extrusion thereby creating a noncollapsing annular orifice necessary to produce a hollow fiber. The residency time of the melt in the die chamber varies between 2-5 minutes.

The hollow strand of approximately 8,000 denier is drawn down at a ratio of 10-25 times the calculated die velocity speed in order to provide a smooth hollow fiber with an outside diameter of 6 mils and inside diameter of 2 mils. The resulting hollow fiber is then passed through a bath containing 20 parts hexamethylene diisocyanate, 2 parts dibutyl tin acetate and 100 parts of toluene. The fiber is cut into lengths 3 feet long and were cured under slight tension at 90° C. for 2 hours. Fifty lengths are inserted into a 2¾-foot long stainless steel tubing and potted in place at each end with epoxy resin (fiber ends remain open). The resulting fiber test cell is attached to the test system used in example 1 so that the standard brine solution passes through the stainless steel tube over the outside of the fibers. The permeate coming through the fiber center orifice is collected and analyzed. At 300 p.s.i., water flux is 0.8 g.f.d. with rejections of 97 percent for sodium ion, 95 percent for chloride ion, and 99 percent for sulfate ion.

As has been demonstrated in the examples, excellent reverse osmosis membranes can be prepared from hydroxyalkyl derivatives of cellulose as previously defined. All of the cellulose derivatives employed in the invention can be obtained by reacting cellulose with alkylene oxide, a mixture of alkylene oxides, a mixture of alkylene oxide and an aryl or alkyl halide, or a mixture of alkylene oxide or a mixture of alkylene oxide and an alkyleneimine, as the case may be. In addition blends of various of the aforementioned hydroxyalkyl cellulose derivatives can be used. A variation in chemical structure which is positive permits a wide but controlled variation in the hydrophilic nature of the resultant cellulose derivative. In general the greater number of carbon atoms in the substituent or substituents modifying the cellulose molecule, the less hydrophilic is the resultant cellulose derivative. The hydrophilic nature of the cellulose derivative is in turn relatable to its performance in a membrane. The more hydrophobic the derivative, the greater is its ability to reject salt ions and the lower its permeate flux rate, and vice versa.

The molecular weight of the cellulose derivative, which is determined to a great extent by the molecular weight of the cellulose employed as the starting material, is also a factor in affecting the performance of the cellulose derivative when used in a membrane. As the examples have shown, higher molecular weight derivatives give increased salt-rejecting capacity in the membranes with generally lower flux rates. It has also been demonstrated as in example 7 that narrow molecular weight distribution (which is a function of the molecular weight distribution of the parent cellulose) leads to improved properties in the ultimate membrane. All of the foregoing factors can be manipulated to achieve a balance of desired properties in the ultimate membrane.

Specifically, the cellulose derivatives useful in the invention can be prepared by reacting cellulose with, for example, any one of the reactants or mixtures of reactants listed below.

ethylene oxide
    propylene oxide
    butene oxide (including all isomers)
    pentene oxide (including all isomers)
    hexene oxide (including all isomers)
    ethylene oxide and propylene oxide
    propylene oxide and butene oxide
    ethylene oxide and butene oxide
    propylene oxide and ethyl chloride
    ethylene oxide and ethyl bromide
    propylene oxide and ethyleneimine
    ethylene oxide and ethyl chloride
    propylene oxide and methyl chloride.

The common denominator in the above list is an alkylene oxide containing from two to six carbon atoms and, in the case of the foregoing mixtures which contain an alkyl halide or alkyleneimine, the alkyl halide or alkyleneimine is desirably employed in a relatively small amount in proportion to the alkylene oxide, generally not more than about 40 percent by weight of alkylene oxide. The alkylene oxide, of course, is employed as previously specified in an amount to produce a cellulose derivative having a hydroxyalkyl M.S. of at least 1.

Cross-linking of hydroxyalkyl derivatives of cellulose is known in the art in accordance with the description previously given. The amount of cross-linking agent employed should be sufficient to give complete gelation of the membrane film. For dimethylolurea, for example, this amounts to a weight percentage of from about 0.5 percent to 40 percent of the cellulose derivative and for p-toluene diisocyanate, from 0.05 percent to 4.0 percent of the cellulose derivative. For cross-linking with a dialkylol compound, an acidic catalyst is employed, while for cross-linking with a diisocyanate, dibutyl tin diacetate is a useful catalyst.

The cross-linking agent can either be incorporated in the casting solution of the cellulose derivative or allowed to diffuse into the film from one surface after casting. In the latter case a concentration gradient of the cross-linking agent is induced in the film. In this manner, asymmetric membranes can be prepared which give greater porosities, flux rates and ease of handling at equivalent salt rejections. In either case, cross-linking is effected by heating to a temperature of about 25° C. to 100° C.

The examples have demonstrated the preparation of planar membranes comprising thin films of the cellulosic polymer supported on a microporous substrate permeable to saline water. The membranes can be either a single layer cast on the substrate or several layers successively cast and cross-linked one upon the other. In the latter embodiment, multilayer membranes can be prepared which give, for example, greater porosities, strength, and resistance to compaction. The essential element of the membranes of the invention is a thin film of a cellulose derivative as above defined. The thickness of the film can be varied considerably from less than a micron up to about 2.0 mils but is desirably as thin as can be obtainable by the process employed for its preparation. The examples have principally demonstrated the preparation of films by casting. In addition satisfactory films can be prepared by compression molding and extrusion, as well as by spraying and dip coating techniques.

In the case of films in any form other than a hollow fiber it is necessary that the film be supported upon a microporous substrate which is permeable to saline water, the substrate being necessary to provide a structure of sufficient strength to serve as a membrane. Useful supports are well known in the art of desalination and can be prepared from various materials such as nylon, cellulose acetate, polyvinyl chloride, nitrocellulose, metals, poly(tetrafluoroethylene), and other materials. Desirably, this support should have as small a pore size as is consistent with impermeability to salt ions. A suitable pore size range is from about 0.005 to 5 microns.

In the preparation of planar membranes a film of the cellulosic derivative can be cast directly upon the substrate, or the film can be separately formed and then laid upon the substrate, both techniques having been illustrated in the examples. Prewetting of the substrate with a liquid which does not swell it is desirable to prevent expansion or contraction of the substrate during casting and drying.

It is also possible to fabricate membranes in the form of thin-walled hollow fibers. In such a case a support or substrate is not generally necessary since the hollow fiber can be constructed to be self-supporting.

Membranes of this invention are eminently useful for desalting brackish water and sea water. In addition, they are also useful in other industrial applications employing the principle of reverse osmosis such as purification of water supplies, purification and concentration of waste streams before disposal, and concentration of various materials such as maple syrup, citrus juice, whey, coffee, soup, malt beverages, and spent sulfite pulping liquors. Thus, these membranes are useful in the food and beverage industry, the chemical industry, in the forest products industry, and in the medicinal and pharmaceutical industries.

What we claim and desire to protect by Letters Patent is:

1. A reverse osmosis membrane comprising a film having a thickness of not more than 2.0 mils of a cross-linked hydroxyalkyl derivative of cellulose supported upon a microporous substrate permeable to salt ions, said hydroxyalkyl derivative of cellulose being selected from the group consisting of
   A. hydroxyalkyl ethers of cellulose in which the hydroxyalkyl group contains from two to six carbon atoms;
   B. mixed hydroxyalkyl ethers of cellulose in which the hydroxyalkyl groups contain an average of from two to six carbon atoms;
   C. mixed hydroxyalkyl-alkyl and mixed hydroxyalkyl-aralkyl ethers of cellulose in which the hydroxyalkyl group contains from two to six carbon atoms and, respectively, the alkyl group contains from one to six carbon atoms and the aralkyl group contains from 7 to 12 carbon atoms; and
   D. mixed hydroxyalkyl-aminoalkyl ethers of cellulose in which the hydroxyalkyl group contains from two to six carbon atoms and the aminoalkyl group contains from two to 10 carbon atoms;

and having a degree of polymerization within the range of about 25 to 5,000 and a hydroxyalkyl M.S. of at least 1 and a D.S. of at least 2.

2. A reverse osmosis membrane consisting of a walled hollow fiber having a wall thickness of not more than 2.0 mils of a cross-linked alkoxy derivative of cellulose selected from the group consisting of
   A. hydroxyalkyl ethers of cellulose in which the hydroxyalkyl group contains from two to six carbon atoms;
   B. mixed hydroxyalkyl ethers of cellulose in which the hydroxyalkyl groups contain an average of from two to six carbon atoms;
   C. mixed hydroxyalkyl-alkyl and mixed hydroxyalkyl-aralkyl ethers of cellulose in which the hydroxyalkyl group contains from two to six carbon atoms and, respectively, the alkyl group contains from one to six carbon atoms and the aralkyl group contains from seven to 12 carbon atoms; and
   D. mixed hydroxyalkyl-aminoalkyl ethers of cellulose in which the hydroxyalkyl group contains from two to six carbon atoms and the aminoalkyl group contains from two to 10 carbon atoms;

and having a degree of polymerization within the range of about 25 to 5,000 and a hydroxyalkyl M.S. of at least 1 and a D.S. of at least 2.

3. The membrane of claim 1 in which the cellulose derivative is hydroxypropyl cellulose.

4. The membrane of claim 1 in which the cellulose derivative is hydroxypropyl-hydroxybutyl cellulose.

5. The membrane of claim 2 in which the cellulose derivative is hydroxypropyl cellulose.

6. The membrane of claim 2 in which the cellulose derivative is hydroxypropyl-hydroxybutyl cellulose.

7. The membrane of claim 1 in which the cellulose derivative is hydroxyethyl cellulose.

8. The membrane of claim 2 in which the cellulose derivative is hydroxyethyl cellulose.

9. The membrane of claim 1 in which the cellulose derivative has been cross-linked by reaction with a cross-linking agent containing at least two alkylol groups.

10. The membrane of claim 1 in which the cellulose derivative has been cross-linked by reaction with a compound containing at least two isocyanate groups.

11. The membrane of claim 2 in which the cellulose derivative has been cross-linked by reaction with a cross-linking agent containing at least two alkylol groups.

12. The membrane of claim 2 in which the cellulose derivative has been cross-linked by reaction with a compound containing at least two isocyanate groups.

13. The membrane of claim 1 in which the cellulose derivative has been cross-linked to give a cross-link gradient across the film thickness.

14. The membrane of claim 2 in which the cellulose derivative has been cross-linked to give a cross-link gradient across the film thickness.

15. The membrane of claim 1 in which successive layers of cellulosic derivatives are cast and cross-linked to give a multilayer membrane.

16. The membrane of claim 2 in which successive layers of cellulosic derivatives are cast and cross-linked to give a multilayer membrane.

17. The process of desalinating water which comprises contacting saline water under pressure with the membrane of claim 1 whereby water molecules are caused to pass through the membrane while the salt ions are rejected from passing through the membrane.

18. The process of desalinating water which comprises contacting saline water under pressure with the membrane of claim 2 whereby water molecules are caused to pass through the membrane while the salt ions are rejected from passing through the membrane.

* * * * *

PO-1050
(5/69)

UNITED STATES PATENT OFFICE
CERTIFICATE OF CORRECTION

Patent No. __3,620,970__   Dated __November 16, 1971__

Inventor(s) __Klug, Spurlin & Young Case 1__

It is certified that error appears in the above-identified patent and that said Letters Patent are hereby corrected as shown below:

Col. 2, line 2 of the printed patent, after " of " first occurrence omit -- two prepared is six -- and insert -- the invention are prepared is selected from --.

Col. 2, line 41 of the printed patent, after " membranes " insert -- , the invention contemplates only reverse osmosis membranes --.

Col. 2, line 50 of the printed patent, " ethylene-dimethylolorea " should read -- ethylenedimethylolurea --.

Col. 4, lines 10, 11, 12, 16 and 36 of the printed patent, in each case " $Cl^{7E}$ " and " $SO_4$ $^{7E}$ $^{7E}$ " should read -- $Cl^-$ -- and -- $SO_4^{--}$ -- respectively.

Col. 7, line 23 of the printed patent omit " 2 3/4 ".

Col. 7, line 59 of the printed patent, " positive " should read -- possible --.

Col. 9, line 41 of the printed patent after " concentration of " insert -- process recycle streams, purification and concentration of --.

Signed and sealed this 23rd day of May 1972.

(SEAL)
Attest:

EDWARD M.FLETCHER,JR.
Attesting Officer

ROBERT GOTTSCHALK
Commissioner of Patents